Patented Aug. 1, 1939

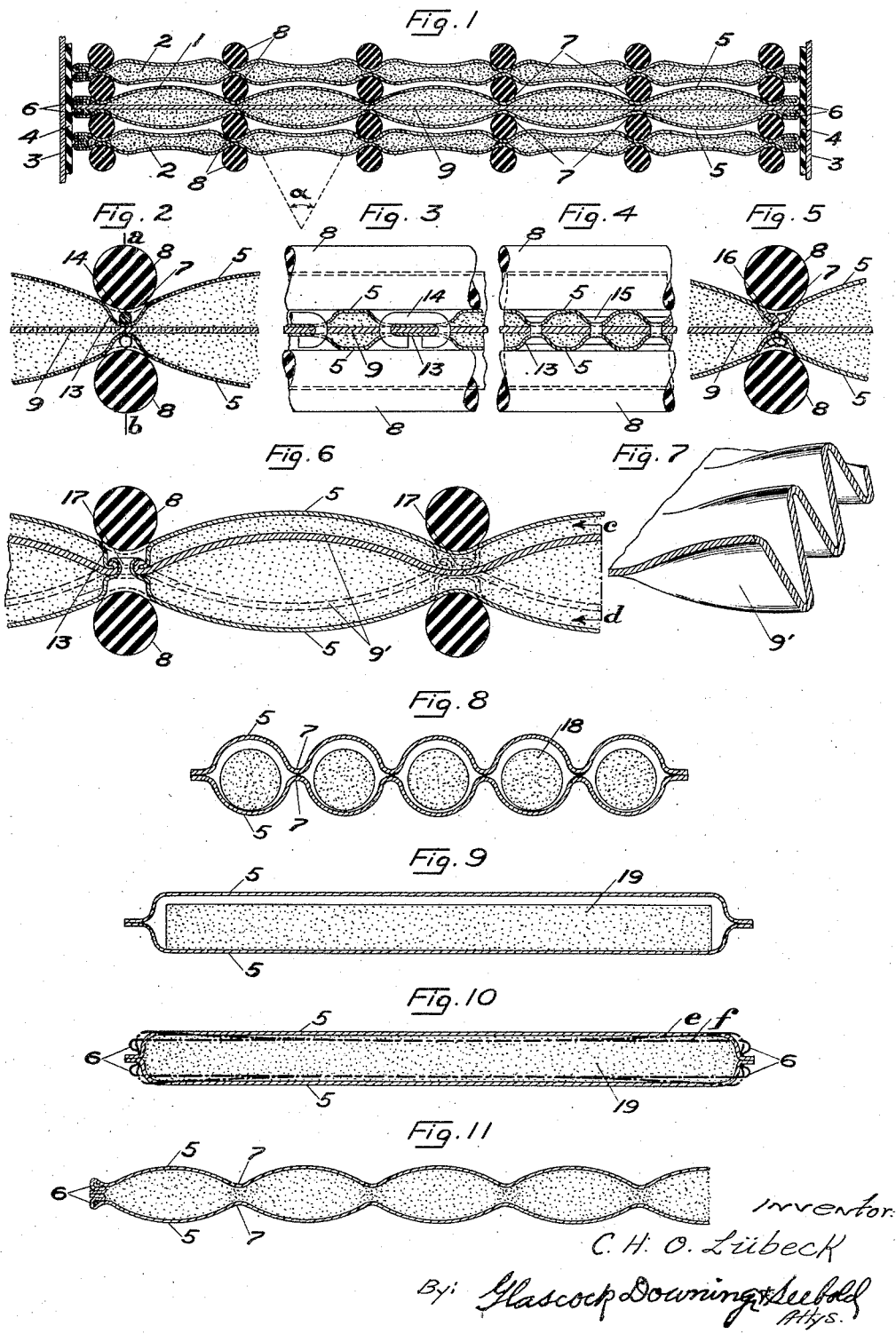

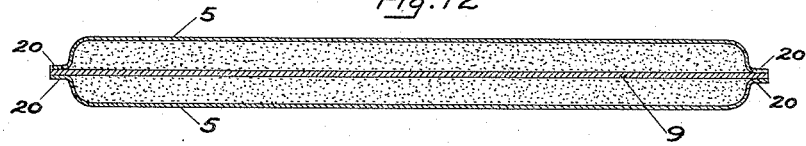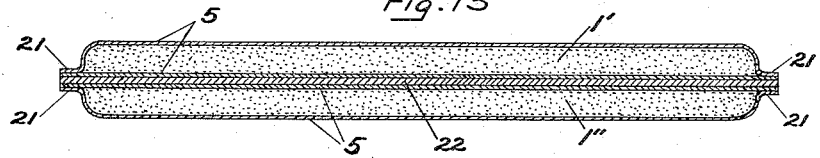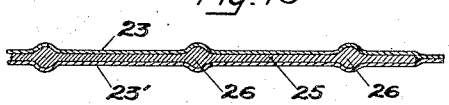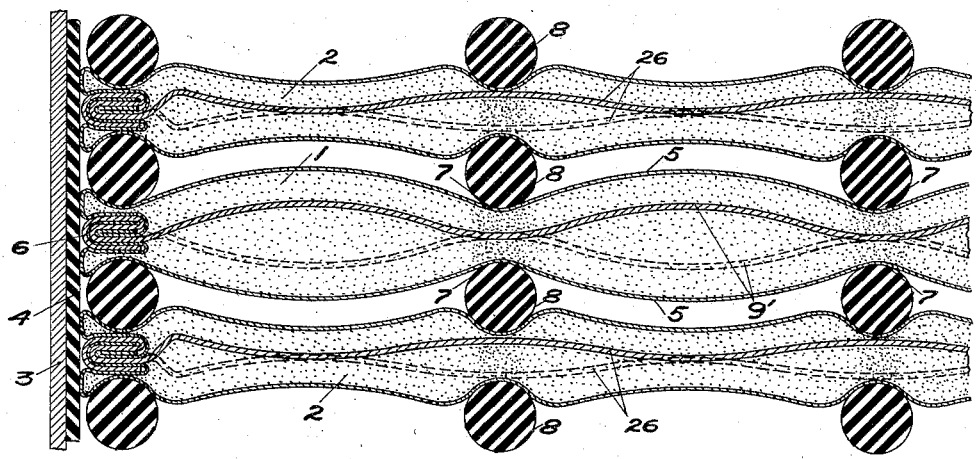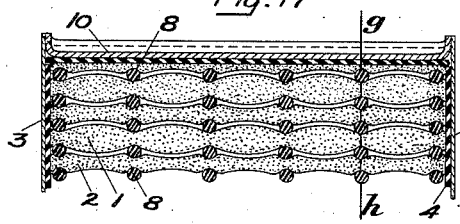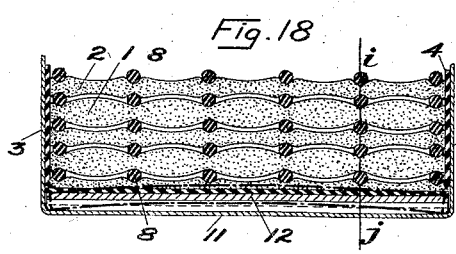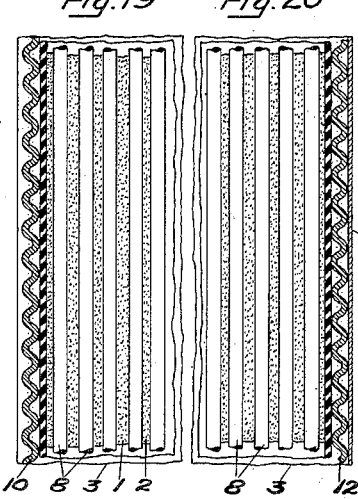

2,167,809

UNITED STATES PATENT OFFICE 2,167,809

ELECTRIC ALKALINE ACCUMULATOR

Carl Hilding Ossian Lübeck, Islingehill, Lidingo, Sweden

Application June 10, 1936, Serial No. 84,557
In Sweden July 30, 1932

9 Claims. (Cl. 136—37)

This invention relates to alkaline accumulators in which the active mass of the electrodes is enclosed between thin perforated sheet metal walls forming a container for the mass, said container being generally made up of a number of narrow parallel sections or pockets. In an alkaline accumulator the active mass of the positive electrodes has a tendency of swelling when the electrodes are brought into contact with the electrolyte and during the chemical reactions taking place in the accumulator, wherefore special means must be provided to prevent or efficiently counteract deformation of the electrodes owing to said tendency of swelling. In some cases the pockets of the electrodes have been made in the form of cylindrical tubes in order to efficiently prevent deformation. An accumulator in which the electrodes are composed of cylindrical tubes has, however, besides some other disadvantages a relatively small specific capacity, since the space in the cell can available for the active material is not utilized to the best advantage. The specific capacity of the accumulator can be considerably increased if the pockets of the electrodes are given a substantially flat shape, which also in other respects is preferable. Electrodes of this kind may be manufactured by joining together separate pockets along their longitudinal edges through folding operations. Another method of manufacturing electrodes having substantially flat pockets consists in joining together two thin sheet metal plates along parallel lines by means of folds or the like and forming substantially flat pockets for the active material between adjacent folds. The specific capacity of this kind of electrodes is, however, also unduly reduced owing to the fact that considerable space is taken up by the folds. Furthermore, it has been found extremely difficult to efficiently prevent deformation of such flat shaped pockets of the electrodes.

The present invention has for its principal object to improve the design of positive electrodes for alkaline accumulators having substantially flat pockets or containers for the active material, so that deformation of the flat pockets is entirely prevented and at the same time a considerably increased capacity of the accumulator is obtained. According to the invention the active material of each positive electrode is enclosed between two integral perforated thin sheet metal plates or side walls divided by grooves into parallel sections, and secured in fixed positions relatively to each other, preferably by means of spacing members of insulating hard material disposed along the bottom lines of said grooves, each disposed right opposite a corresponding groove of the other side wall, said sections forming cylindrical segments with angles at centre less than 180° and with their convex sides turned outwards. Two opposite sections of the sheet metal plates form between them a substantially flat pocket for the active material, the flatness more or less depending upon the desired thickness of the electrode. The pocket thus formed is practically non-deformable by internal pressure, since the walls of the pocket are cylindrical in shape and are firmly secured along parallel edges extending in the direction of the generatrix of the cylindrical surface.

Obviously, the means for securing the bottoms of the grooves between adjacent sections of the electrode walls in fixed positions relatively to each other must be so devised as to maintain not only a constant relationship between opposite bottom lines of the grooves, but also to prevent lateral contraction of the sections in the electrode plane perpendicularly to said bottom lines, in consequence of the tendency of the active mass to swell and thereby to bulge out the cylindrical sections of the metal plates and, consequently, to reduce the distance between the bottom lines constituting the parallel edges of the sections. The two electrode walls may if desired be connected together along the bottom lines of the grooves by means of welding or riveting or by means of other internal connections.

According to a preferred embodiment of the invention there are provided, instead of internal connections between the electrode walls, external means for securing the bottom lines of the grooves of the electrode walls in fixed positions. These external securing means preferably consist of spacing members of insulating hard material, for instance hard rubber rods, which engage the bottoms of the grooves. These spacing members are anchored for instance in depressions formed in the walls of the neighbouring negative electrodes, which, owing to their firmness, to which the hardness of the negative electrode mass largely contributes, form rigid intermediate panes between the positive electrodes in the group of electrodes of the cell. The spacing members, which engage the grooves in the positive electrodes and corresponding depressions of the negative electrodes are arranged in alignment, and the different rows of such spacing members, in conjunction with a pressing sleeve or the like, known per se, tightly surrounding the group of electrodes, constitute rigid frameworks or bridges by means of which the positive electrodes are firmly clamped along the bottom lines of their grooves, thus efficiently counteracting lateral contraction of said sections.

In order, however, to increase still further the capability of the electrodes to resist lateral contraction, the electrodes may according to the invention be provided with internal stiffening members or core plates incorporated into the electrodes and for instance consisting of sheet metal plates, preferably clamped between the outer vertical edges of the electrode walls. In order to increase the stiffness of these members the same may be provided with corrugations, plaits or the like extending perpendicularly to the parallel sections of the sheet metal walls of the electrodes. The metallic insertions will at the same time very efficiently serve as collectors for the electric current, so as to improve the electric conductivity of the electrodes, thereby considerably reducing the internal resistance of the accumulator.

The invention will be more closely described with reference to the accompanying drawings.

Figure 1 is a horizontal section in about twice the actual size of a part of the group of electrodes of a cell according to one embodiment of the invention. Figure 2 is a portion of a horizontal section in about five times the actual size of a positive eelctrode according to a second embodiment, and Figure 3 is a section along the line a—b in Figure 2. Figure 4 is a corresponding section of a third embodiment and Figure 5 a section corresponding to Figure 2 of still another embodiment. Figure 6 is a horizontal section in about five times the actual size of a portion of a positive electrode according to a further embodiment, and Figure 7 is a perspective sectional view of a bit of the stiffening plate or core plate of the electrode according to Figure 6, in a cut through the line c—d. Figure 8 is a section, in about twice the actual size, of an electrode in a preliminary stage of manufacture. Figures 9 and 10 illustrate preliminary stages of manufacture of electrodes, shown in about twice the actual size, according, for instance, to the embodiment shown in Figure 11. Figure 12 shows a preliminary stage of manufacture of positive electrodes, provided with core plates, for instance as shown in Figure 1, and Figure 13 is a similar view of another embodiment. Figures 14 and 15 are details of metallic insertion plates according to different embodiments. Figure 16 is a horizontal section on an about five times enlarged scale of a part of the group of electrodes of a cell, viz., of a part of one positive and of two negative electrodes, according to a further embodiment. Figures 17 to 20 show schematically in about actual size a group of electrodes, for instance according to the embodiment shown in Figure 16, inserted in a pressing sleeve, Figure 17 being a horizontal section of one end of an accumulator cell according to the invention and Figure 18 a similar view of a modified embodiment while Figures 19 and 20 are vertical sections along the lines g—h in Figure 17 and i—j in Figure 18 respectively.

In Figure 1 one of the positive electrodes 1 of an alkaline accumulator according to the invention is shown together with the two neighbouring negative electrodes 2 and part of the longitudinal walls 3 of the cell can containing the group of electrodes. Between the metal walls 3 and the vertical edges of the electrodes are disposed thin plates 4 of hard rubber or other suitable insulating material. The active mass of the positive electrode is enclosed between two integral perforated sheet metal plates 5, the vertical edges of which are connected together at 6. Each of the sheet metal plates 5 is subdivided into sections by parallel grooves 7 extending in vertical direction in equal distances from one another, each of said sections forming a cylindrical segment having an angle at centre α less than 180° and having its convex side turned outwards. The positive and negative electrodes are separated from one another by means of rod-shaped spacing members 8 of hard insulating material, for instance hard rubber, said spacing members engaging on the one hand the grooves 7 of the positive electrodes and on the other hand engaging corresponding grooves or depressions of the negative electrodes. Each of the said cylindrical segments of each electrode wall 5 forms together with a corresponding segment of the opposite wall of the same electrode a substantially flat pocket or container for the active mass. The active mass within each pocket is subdivided into two equal layers by a metal core plate 9 which extends throughout the whole width and height of the electrode in the middle place thereof and the vertical edges of which are preferably folded or electrically spot welded together at 6 with the vertical edges of the electrode walls 5. The core plate 9, which serves in a manner referred to above as a stiffening member for the positive electrode, is in the embodiment shown in Figure 1 in contact with the perforated sheet metal walls 5 along the bottom lines of the grooves 7 and is preferably firmly connected therewith along said lines of contact by means of electrical spot or seam welding or by other means.

In the modified embodiments shown in Figures 2 to 6 which are preferably intended to be used for thicker electrodes, the bottoms of the grooves 7 are not in contact with the stiffening member or core plate 9 along continuous lines of contact, but only at separate points or spots, in that further depressions 13 are formed at the bottoms of the grooves 7 at equal distances from each other along the grooves, the tips of said depressions being in contact with the core plate 9. At these points of contact the electrode walls 5 may be united with the core plate 9 by spot welding or by other securing means.

Figures 2 to 6 show by way of example the use of binding or securing members applied to the depressions 13 for securing the electrode walls 5 to the core plate 9. In Figure 2 said binding members consist of pieces of thin wire threaded through holes in the bottoms of the depressions 13 and through the plate 9 and bent so as to form cramps 14. In Figure 4 the binding members consist of rivets 15. In Figure 5 small tongues 16, stamped out from the core plate 9 and extending through holes in the bottom of the depressed portions 13, are bent at their free ends so as to engage the electrode walls at the bottoms of the depressions. The tongues 16 are preferably bent alternately to the left and to the right as shown in Figure 5.

In Figure 6 there is formed at the bottom of each of the depressions 13 in one of the electrode walls a tubular extension or rivet 17, which protrudes through a hole at the bottom of the corresponding depression of the opposite wall of the electrode, the edge of said tubular extension being staved so as to serve as a rivet-head or the like. In the embodiment according to this figure the insertion or stiffening member 9' is formed with transversal corrugations or folds in order to increase the stiffness thereof, said corrugations, as shown in Figures 6 and 7, being suitably so shaped as to accommodate to the segments of the electrode walls 5.

Figure 8 illustrates a preliminary stage of manufacture of a positive electrode similar to the electrode 1 in Figure 1, but differing therefrom in that the stiffening member or core plate 9 is dispensed with. The sections of each of the electrode walls 5 are in this preliminary stage suitably of half-cylindrical shape, so that the pockets for the active material formed between corresponding cylindrical segments of the two walls 5 will thus take the shape of circular tubes. If the electrode walls 5 are to be united by electrical spot welding along the bottom lines of the grooves 7, the welding operation may in this case suitably be carried out before the active material is introduced into the pocket, to avoid the said material being damaged, as otherwise to some extent might occur by the heat of welding. The active material, for instance formed in the shape of circular rods 18 having a diameter somewhat smaller than the inner diameter of the tubular pockets is then introduced and by milling or pressing operations the pockets are flattened out and the electrode is brought into a form similar to that of the electrode 1 in Figure 1.

The bottoms of the grooves 7 of the positive electrodes may, however, be firmly secured in definite position without having recourse to internal connections, as above described, in that external securing means may be substituted therefor. To this end a pressing device is provided for the electrodes, as shown in Figures 17 to 20, said pressing device consisting of a rectangular sleeve tightly surrounding the whole group of electrodes and having reinforced end walls or gables so as to enable these to effectively resist without deformation the considerable strain of flexure exerted by the internal forces on account of the tendency of swelling of the positive electrodes, and transferred to said gables. The reinforced gables of the said sleeve may for instance consist of transversally corrugated plates 10 (Figures 17 and 19), which are welded at their vertical bent out edges to the longitudinal walls 3 of the sleeve. Figures 18 and 20 show another embodiment of the sleeve, in which the reinforcement of the gables 11 of the sleeve is brought about by the insertion of transversally corrugated metal clamping plates 12 each disposed on the inner side of the appertaining gable 11, viz., between the gable 11 and the group of electrodes. These corrugated plates 12 may suitably consist of such material, for instance steel, which is capable of being hardened. The corrugation of the plates 10 or 12 should preferably extend laterally over the entire width of the gables of the sleeve or cell can. The corrugated plates 12 may initially be slightly bent inwardly so that the corrugations are somewhat curved longitudinally as indicated in chain lines in Figure 18 in order to exert an increased pressure on the group of electrodes.

A pressing sleeve tightly surrounding the group of electrodes and capable of resisting the internal pressure is always to be used according to the invention if the electrode walls, in contradistinction to the embodiments shown in Figures 1 to 6, are not united with one another and to an internal stiffening plate by internal connections, or if the stiffening plate is dispensed with, as in the embodiments indicated in Figure 8 and in Figures 9 to 11 which latter are to be described in the following. The group of electrodes partly shown in Figure 16 is accordingly also to be clamped between the reinforced gables of such pressing sleeve the reference numeral 3 indicating one of the side walls of the sleeve. Each electrode, or more particularly each section of the positive and negative electrodes, is firmly secured in definite position through the intermediary of the rows of spacing members 8, extending between the reinforced gables of the pressing sleeve, as by the conjoint action of these rows, the sleeve and the negative electrodes, a rigid framework or the like is formed, in which the positive electrodes are clamped along the bottom lines of the parallel grooves 7 of the electrode walls 5. By these means disjunction of the walls 5 of the positive electrodes is counteracted or prevented. On account of the firmness of the negative electrodes these serve as rigid holders for the spacing members 8 which, as stated above, are resting in grooves or depressions in said negative electrodes, whereby lateral displacements of said spacing members 8 and lateral contraction of the positive electrodes are effectively prevented. Contraction of the positive electrodes in their own plane perpendicular to the spacing members 8 is further counteracted by the stiffening action of the insertions 9'. In some cases, as stated above with reference to Figures 17 to 20, these insertions may be dispensed with if the group of electrodes is firmly clamped within a surrounding pressing sleeve, in that the rigid negative electrodes in cooperation with the spacing members 8 may be able to prevent lateral contraction of the positive electrodes.

Figures 9 to 11 show some other embodiments of positive electrodes in successive stages of manufacture. In these cases the electrode walls 5 are connected together only at their vertical edges. The active material is introduced between the walls in the form of a continuous layer or tablet 19 extending substantially throughout the whole width of the electrode. The connection of the electrode walls at their vertical edges, for instance by spot welding, may be made before or after the introduction of the active material. The electrode is then subjected to milling or pressing operations and successively flattened out and compressed, as indicated in Figure 10 by full lines and by chain lines e and f, so that it is completely filled out by the active material, the vertical joints being thereby if desired successively retracted, as shown at 6 in Figures 10 and 11. By further milling operation the grooves 7 are formed and the joints are finished off at the vertical edges, for instance as indicated in Figure 11.

In the embodiment according to Figure 11 the internal stiffening member or core plate is dispensed with, similarly to the embodiment shown in Figure 8. Electrodes according to the embodiment of Figure 11 are therefore likewise to be used only in such accumulator cells, which are provided with a pressing sleeve surrounding the group of electrodes, as shown in Figures 17 and 18.

Figure 12 shows a horizontal section of an electrode body in a preliminary stage of manufacture of positive electrodes 1 substantially in accordance with Figure 1. The electrode according to Figure 16 may be manufactured in a similar manner, in which case, however, the core plate is provided with corrugations before it is introduced. The active material forms continuous layers on both sides of the stiffening member or core plate 9, the vertical edges of which are preferably inserted at 20 between the edges of the electrode walls 5 and may be secured thereto by welding or in other suitable way. By milling or pressing operations grooves 7 as in Figure 1 or Figure 16, are subsequently formed in the electrode body, if desired in such manner that the bottoms of the grooves are brought into contact with the core plate 9, as in Figure 1, and connections are, if desired, provided between the electrode walls and the core plate along the lines of contact.

Instead of disposing the stiffening member or core plate within the active material proper, as in Figures 1 to 6, 12 and 16, it may in special cases, as for instance for electrodes of very large size, be preferred to introduce a thicker core plate between two separate part electrodes. In the embodiment illustrated in Figure 13, which is a horizontal section of a double electrode body in a preliminary stage of manufacture, the electrode is subdivided into two part electrodes or electrode halves 1' and 1'', each of which forms a closed container for the active material. The vertical edges of the electrode walls 5 of each part electrode may be united at 21 substantially in the planes of the inner sides of the electrode halves. The two part electrodes 1' and 1'' are assembled to a double electrode with the said inner sides in contact with an intermediate plate 22, which serves as a stiffening member for the electrode and also serves as a current collecting means as referred to above. The double electrode body in Figure 13 is subsequently subjected to milling or pressing operations in order to obtain an external shape as described above, or, if desired, each half may be formed separately, one side of each half being made flat, and the intermediate plate 22 being afterwards introduced between the flat sides of the two part electrodes.

The intermediate or core plate may be composed, as indicated in the section shown in Figure 14, of two thin plates 23 and 23' of material resistant to the influence of the electrolyte, such as steel or nickel, between which plates are inserted conductors 24, for instance of copper, the edges of the two thin plates being watertightly sealed by welding. A modification of the intermediate plate is indicated in Figure 15, where a continuous sheet of copper 25 is inserted between the plates 23, 23', said copper sheet being provided with thickenings at 26.

Figure 16 referred to above, is a section of a portion of one positive electrode 1 and two neighbouring negative electrodes 2 with appertaining spacing members 8. The positive electrode 1 is provided with a transversally corrugated core plate 9' as in Fig. 6. The negative electrodes 2 may also be provided with corrugated core plates 26 serving particularly as current collecting members. A group of electrodes thus composed in which internal connections between the side walls are dispensed with should always, as previously mentioned, be enclosed in a pressing sleeve or in a cell can designed to serve as a pressing sleeve, as shown diagrammatically in the Figures 17 to 20 and as described above.

As will be understood from the foregoing description the principal object of the present invention is to bring about, in a simpler and more inexpensive manner than has been possible hitherto, such construction of positive electrodes for alkaline accumulators that deformation of the electrodes by internal pressure is efficiently prevented, and a further important object is to obtain electrodes of most suitable form, in order to increase the specific capacity as well as the load capacity of the accumulator. The means which are used for these purposes according to the invention may be summed up as follows:

1. Each of the two side walls of the positive electrodes is made in one piece and is divided by parallel grooves into sections, each section forming a segment of a cylindrical surface.

2. Inner connections or external securing means applied to the said grooves serve to maintain the two side walls in fixed relation to each other and thereby to prevent efficiently disjunction of the walls.

3. Means are provided for preventing lateral dislocation of the said grooves under the influence of the internal pressure, thereby also preventing lateral contraction of the pockets of the electrode.

As compared with the known construction referred to above, according to which the positive electrodes are made up of cylindrical tubes, the construction according to this invention affords the advantage that a considerable increase of the specific capacity of the accumulator is obtained, and through the possibility of making thin electrodes, particularly when core plates are used, the load capacity is considerably improved. Furthermore the manufacture is greatly simplified. As an example it may be mentioned, that an electrode of a standard size of said known design composed of tubular pockets comprises several hundred separate parts, whereas an electrode according to the present invention in a preferred embodiment is made up of but three or four parts.

In manufacturing the electrodes according to the invention the active material is applied between two "endless" nickelplated steel bands of a width corresponding to the width of the electrodes, and said two bands are united at their longitudinal edges. If the electrodes are to be provided with a stiffening plate or metal core a third endless steel or nickel band is introduced together with the mass between the two bands first mentioned. The band-shaped body thus formed is subjected to a continuous series of compressing and forming operations in automatic machinery and is finally cut into pieces of suitable length corresponding to the desired height of the electrodes. Each of these pieces is closed up at one of its open ends and is provided at the other open end with a contact member embracing the edges of the metal walls and united with these and preferably also with the core plate if such plate is used.

The electrodes according to the invention may be made in any required thickness, even as thin as 2 or 3 mm.

As seen from Figures 1, 16, 17 and 18 the biconcave shape of the sections of the negative electrodes may be made to follow very closely the biconvex shape of the corresponding sections of the neighbouring positive electrodes, so that practically uniform distance between electrodes of opposite polarity may be obtained, which distance can also be kept smaller than otherwise usual without risk or short-circuiting. The said shapes viz. volumes of the positive and negative sections or pockets also answer extremely well to the relationship between the capacity pro unit of volume of the positive and of the negative mass used in alkaline accumulators.

I claim:

1. In an alkaline accumulator a positive electrode comprising in combination a continuous layer of active material extending throughout the width of the electrode, two integral perforated sheet metal walls enclosing said layer and being formed with parallel bulges shaped in cross-section as circular arcs with angles at centre less than 180° and separated by grooves, and rigid connections between the bottoms of adjacent grooves preventing alteration of the distances between the grooves by internal pressure in the active material.

2. A positive electrode for alkaline accumulators comprising in combination two perforated integral sheet metal walls, active material enclosed between said sheet metal walls, said walls being formed with parallel bulges shaped in cross-section as circular arcs with angles at centre less than 180° and separated by grooves, a stiffening plate inserted between said sheet metal walls, and means securing said sheet metal walls at the bottoms of the grooves to said stiffening plate thereby providing rigid connections between the bottoms of adjacent grooves preventing alteration of the distances between the grooves by internal pressure in the active material.

3. A positive electrode for alkaline accumulators comprising in combination two perforated integral sheet metal walls, active material enclosed between said sheet metal walls, said walls being formed with parallel bulges shaped in cross-section as circular arcs with angles at centre less than 180° and separated by grooves, a corrugated stiffening plate inserted between said sheet metal walls, the corrugations of said stiffening plate extending perpendicularly to the bulges of said walls, and means securing said sheet metal walls at the bottoms of the grooves to said stiffening plate thereby providing rigid connections between the bottoms of adjacent grooves preventing alteration of the distances between the grooves by internal pressure in the active material.

4. A positive electrode for alkaline accumulators comprising in combination two perforated intergral sheet metal walls, active material enclosed between said sheet metal walls, said walls being formed with parallel bulges shaped in cross-section as circular arcs with angles at centre less than 180° and separated by grooves, a stiffening plate inserted between said sheet metal walls in contact with depressed portions formed at intervals in the bottom of each groove, and means securing said sheet metal walls at the bottoms of the grooves to said stiffening plate thereby providing rigid connections between the bottoms of adjacent grooves preventing alteration of the distances between the grooves by internal pressure in the active material.

5. A positive electrode for alkaline accumulators comprising in combination two perforated integral sheet metal walls, active material enclosed between said sheet metal walls, said walls being formed with parallel bulges shaped in cross-section as circular arcs with angles at centre less than 180° and separated by grooves, a stiffening plate inserted between said sheet metal walls in contact with depressed portions formed at intervals in the bottom of each groove, and means securing said sheet metal walls at the points of contact to said stiffening plate thereby providing rigid connections between the bottoms of adjacent grooves preventing alteration of the distances between the grooves by internal pressure in the active material.

6. In an alkaline accumulator a positive electrode comprising two parallel continuous layers of active material, two sheet metal coverings enclosing each of said layers, a conductor plate inserted between the two inner coverings, the two outer coverings being formed with parallel bulges shaped in cross-section as circular arcs with angles at centre less than 180° and separated by grooves, and rigid connections between the bottoms of adjacent grooves preventing alteration of the distances between the grooves by internal pressure in the active material.

7. In an alkaline accumulator in combination a group of alternating positive and negative electrodes, each positive electrode having its active material enclosed between two integral perforated sheet metal walls, parallel insulating rods bearing against said sheet metal walls and engaging depressions in the opposite negative electrodes, each intermediate portion of said sheet metal walls extending between adjacent rods forming a convex arch with an angle at centre less than 180°, a stiffening plate inserted between the sheet metal walls of each positive electrode, and means compressing said group of electrodes, said compressing means cooperating with said rods and said stiffening plate to secure the abutment lines of said arches in definite positions.

8. In an alkaline accumulator in combination a group of alternating positive and negative electrodes, each positive electrode having its active material enclosed between two integral perforated sheet metal walls formed with parallel bulges shaped in cross-section as circular arcs with angles at centre less than 180° and separated by grooves, parallel insulating rods engaging said grooves and a clamping device tightly surrounding the group of electrodes and capable of resisting the tendency of swelling, displacements of the insulating rods perpendicularly to the planes of the electrodes being prevented by said clamping device and lateral displacements of said rods being prevented by anchoring of the rods in depressions of the opposite negative electrodes.

9. In an alkaline accumulator, a positive electrode comprising in combination a layer of active material contained in said electrode, two integral perforated sheet metal walls enclosing said layer and being formed with parallel bulges shaped in cross-section as circular arcs with angles at center less than 180° and separated by grooves, and rigid connections between the bottoms of adjacent grooves preventing alteration of the distances between the grooves by internal pressure in the active material.

CARL HILDING OSSIAN LÜBECK.